(12) United States Patent
Nooren

(10) Patent No.: US 7,996,024 B2
(45) Date of Patent: Aug. 9, 2011

(54) METHOD FOR PREVENTING THE DELIVERY OF SHORT MESSAGE SERVICE MESSAGE SPAM

(75) Inventor: Eloy Johan Lambertus Nooren, Nigtevecht (NL)

(73) Assignee: Tekelec, Morrisville, NC (US)

( * ) Notice: Subject to any disclaimer, the term of this patent is extended or adjusted under 35 U.S.C. 154(b) by 828 days.

(21) Appl. No.: 11/578,482

(22) PCT Filed: Apr. 14, 2004

(86) PCT No.: PCT/NL2004/000253
§ 371 (c)(1),
(2), (4) Date: Jun. 20, 2007

(87) PCT Pub. No.: WO2005/101872
PCT Pub. Date: Oct. 27, 2005

(65) Prior Publication Data
US 2007/0281718 A1 Dec. 6, 2007

(51) Int. Cl.
*H04Q 7/22* (2006.01)
(52) U.S. Cl. .................... 455/466; 455/412.1
(58) Field of Classification Search .......... 455/412.1, 455/414.1, 433, 445, 466, 550.1; 370/328, 370/337, 349
See application file for complete search history.

(56) References Cited

U.S. PATENT DOCUMENTS

| | | |
|---|---|---|
| 5,282,244 A | 1/1994 | Fuller et al. |
| 5,511,111 A | 4/1996 | Serbetcioglu et al. |
| 5,579,372 A | 11/1996 | Åström |
| 5,701,301 A | 12/1997 | Weisser, Jr. |
| 5,742,905 A | 4/1998 | Pepe et al. |
| 5,768,509 A | 6/1998 | Gunluk |
| 5,862,334 A | 1/1999 | Schwartz et al. |
| 5,903,726 A | 5/1999 | Donovan et al. |
| 5,930,239 A | 7/1999 | Turcotte |

(Continued)

FOREIGN PATENT DOCUMENTS

EP 1432255 6/2004

(Continued)

OTHER PUBLICATIONS

An Official Search Report of the European Patent Office in counterpart foreign application No. PCT/NL2004/000253 filed Apr. 14, 2004.

(Continued)

*Primary Examiner* — Nghi H Ly
*Assistant Examiner* — Myron Wyche
(74) *Attorney, Agent, or Firm* — Jenkins, Wilson, Taylor & Hunt, P.A.

(57) ABSTRACT

Methods, systems, and computer program products for delivery of SMS messages are disclosed. According to one method, first routing data for delivery of an SMS message to a mobile terminal is received at a network element. Second routing data is transmitted from the network element in response to receiving the first routing data. An SMS message having the second routing data is received at the network element. The second routing data is converted at the network element to the first routing data for delivery of the SMS message to a mobile terminal. The network element uses the first and second routing data to correlate a request for the first routing data with receipt of the SMS message. The network element compares an SMSC address in the request for the first routing data with an SMSC address in the SMS message to detect the presence of address spoofing.

15 Claims, 5 Drawing Sheets

U.S. PATENT DOCUMENTS

| | | | |
|---|---|---|---|
| 5,946,630 | A | 8/1999 | Willars et al. |
| 5,987,323 | A | 11/1999 | Huotari |
| 6,047,194 | A | 4/2000 | Andersson |
| 6,061,331 | A | 5/2000 | Conway et al. |
| 6,101,393 | A | 8/2000 | Alperovich et al. |
| 6,108,325 | A | 8/2000 | Stephanson et al. |
| 6,108,559 | A * | 8/2000 | Åstrom et al. ............... 455/466 |
| 6,125,281 | A | 9/2000 | Wells et al. |
| 6,167,129 | A | 12/2000 | Fikis et al. |
| 6,175,743 | B1 | 1/2001 | Alperovich et al. |
| 6,223,045 | B1 | 4/2001 | Valentine et al. |
| 6,259,925 | B1 | 7/2001 | Josse |
| 6,289,223 | B1 | 9/2001 | Mukherjee et al. |
| 6,301,484 | B1 | 10/2001 | Rogers et al. |
| 6,308,276 | B1 | 10/2001 | Ashdown et al. |
| 6,347,374 | B1 | 2/2002 | Drake et al. |
| 6,400,942 | B1 | 6/2002 | Hansson et al. |
| 6,418,305 | B1 | 7/2002 | Neustein |
| 6,513,122 | B1 | 1/2003 | Magdych et al. |
| 6,563,830 | B1 | 5/2003 | Gershon et al. |
| 6,789,203 | B1 | 9/2004 | Belissent |
| 6,795,708 | B1 | 9/2004 | Patel |
| 6,819,932 | B2 | 11/2004 | Allison et al. |
| 6,865,191 | B1 | 3/2005 | Bengtsson et al. |
| 6,934,391 | B1 * | 8/2005 | Linkola et al. ............... 380/247 |
| 7,043,000 | B2 | 5/2006 | Delaney et al. |
| 7,092,357 | B1 | 8/2006 | Ye |
| 7,145,875 | B2 | 12/2006 | Allison et al. |
| 7,237,267 | B2 | 6/2007 | Rayes et al. |
| 7,246,376 | B2 | 7/2007 | Moharram |
| 7,369,839 | B2 * | 5/2008 | Haumont et al. ............. 455/403 |
| 7,401,360 | B2 | 7/2008 | Ravishankar et al. |
| 7,774,849 | B2 | 8/2010 | Russell et al. |
| 2001/0005678 | A1 | 6/2001 | Lee |
| 2001/0006897 | A1 | 7/2001 | Kang et al. |
| 2001/0041579 | A1 | 11/2001 | Smith et al. |
| 2002/0035683 | A1 | 3/2002 | Kaashoek et al. |
| 2002/0133586 | A1 | 9/2002 | Shanklin et al. |
| 2003/0083078 | A1 | 5/2003 | Allison et al. |
| 2003/0084328 | A1 | 5/2003 | Tarquini et al. |
| 2003/0145231 | A1 | 7/2003 | Poletto et al. |
| 2003/0177389 | A1 | 9/2003 | Albert et al. |
| 2004/0015582 | A1 | 1/2004 | Pruthi |
| 2004/0042609 | A1 | 3/2004 | Delaney et al. |
| 2004/0049455 | A1 | 3/2004 | Mohsenzadeh |
| 2004/0054925 | A1 | 3/2004 | Etheridge et al. |
| 2004/0064351 | A1 | 4/2004 | Mikurak |
| 2004/0093512 | A1 | 5/2004 | Sample |
| 2004/0093513 | A1 | 5/2004 | Cantrell et al. |
| 2004/0111843 | A1 | 6/2004 | Farmer |
| 2004/0114741 | A1 | 6/2004 | Ngo et al. |
| 2004/0233851 | A1 | 11/2004 | Baldwin et al. |
| 2005/0025300 | A1 | 2/2005 | Lagadec et al. |
| 2005/0176433 | A1 | 8/2005 | Wilson |
| 2005/0278620 | A1 | 12/2005 | Baldwin et al. |
| 2006/0095970 | A1 | 5/2006 | Rajagopal et al. |
| 2006/0107318 | A1 | 5/2006 | Jeffries et al. |
| 2006/0236402 | A1 | 10/2006 | Russell et al. |
| 2007/0220256 | A1 | 9/2007 | Yasui et al. |

FOREIGN PATENT DOCUMENTS

| | | |
|---|---|---|
| EP | 1 377 909 | 11/2009 |
| WO | WO 99/27726 A | 6/1999 |
| WO | WO 99/37066 A | 7/1999 |
| WO | WO 02/071234 | 9/2002 |
| WO | WO 02/071774 | 9/2002 |
| WO | WO 03/039182 | 5/2003 |
| WO | WO 03/049461 | 6/2003 |
| WO | WO03049461 * | 12/2003 |
| WO | WO 2004/023775 A2 | 3/2004 |

OTHER PUBLICATIONS

A Written Opinion of the European Patent Office in counterpart foreign application No. PCT/NL2004/000253 filed Apr. 14, 2004.
Certificate of Grant of Patent for Singapore Application No. 200606974-4 (Jan. 30, 2009).
Notice of Allowance and Fee(s) Due for U.S. Appl. No. 11/107,413 (Apr. 7, 2010).
Interview Summary for U.S. Appl. No. 11/107,413 (Feb. 1, 2010).
Non-Final Official Action for U.S. Appl. No. 11/107,413 (Oct. 28, 2009).
Interview Summary for U.S. Appl. No. 11/107,413 (Sep. 11, 2009).
Final Office Action for U.S. Appl. No. 11/107,413 (May 6, 2009).
Non-Final Office Action for U.S. Appl. No. 11/107,413 (Nov. 13, 2008).
Communication Pursuant to Article 94(3) EPC for European Application No. 02748368.4 (Oct. 9, 2008).
Supplementary European Search Report for European Application No. 02748368.4 (Jun. 24, 2008).
Notice of Allowance and Fee(s) Due for U.S. Appl. No. 10/308,316 (Apr. 14, 2008).
Non-Final Office Action for U.S. Appl. No. 10/308,316 (Oct. 31, 2007).
Notice of Panel Decision from Pre-Appeal Brief Review for U.S. Appl. No. 10/308,316 (Aug. 24, 2007).
Advisory Action for U.S. Appl. No. 10/308,316 (May 25, 2007).
Notification of Transmittal of International Preliminary Examination Report for International Application No. PCT/US02/06185 (Jan. 30, 2007).
Final Office Action for U.S. Appl. No. 10/308,316 (Jan. 23, 2007).
Non-Final Official Action for U.S. Appl. No. 10/308,316 (May 8, 2006).
Supplemental Notice of Allowability for U.S. Appl. No. 09/908,753 (Mar. 22, 2006).
Notice of Allowance and Fee(s) Due for U.S. Appl. No. 10/234,924 (Jan. 17, 2006).
Notice of Allowance and Fee(s) Due for U.S. Appl. No. 09/908,753 (Dec. 21, 2005).
Non-Final Office Action for U.S. Appl. No. 09/908,753 (Jun. 28, 2005).
Official Action for U.S. Appl. No. 10/234,924 (May 23, 2005).
Official Action for U.S. Appl. No. 10/234,924 (Aug. 13, 2004).
Notice of Allowance and Fee(s) Due for U.S. Appl. No. 09/915,968 (Jun. 14, 2004).
International Search Report for International Application No. PCT/US03/27767 (Jan. 28, 2004).
Non-Final Official Action for U.S. Appl. No. 09/915,968 (Sep. 26, 2003).
Interview Summary for U.S. Appl. No. 09/915,968 (Jun. 25, 2003).
Notification of Transmittal of the International Preliminary Examination Report for International Application No. PCT/US02/06380 (Mar. 13, 2003).
Non-Final Official Action for U.S. Appl. No. 09/915,968 (Mar. 4, 2003).
Notification of Transmittal of International Preliminary Examination Report for International Application No. PCT/US02/06185 (Feb. 21, 2003).
Written Opinion for International Application No. PCT/US02/06380 (Nov. 27, 2002).
Notification of Transmittal of the International Search Report or the Declaration for International Application No. PCT/US02/06185 (Jul. 16, 2002).
Notification of Transmittal of the International Search Report or the Declaration for International Application No. PCT/US02/06380 (Jun. 21, 2002).
"Signaling Transfer Point Generic Requirements," GR-82-Core, Issue 3 (Dec. 1999).
CCS#7 Networks Dependability Studies: Phase 2, Network Integrity Aspects and Qualification Techniques—Restart Procedure and Line Oscillation, vol. 1 of 3: Main Report, dated Aug. 1998 (38 pages).
CCS#7 Networks Dependability Studies: Phase 2, Network Integrity Aspects and Qualification Techniques—Restart Procedure and Link Oscillation, vol. 2 of 3: Annex A—Detailed Analysis, dated Aug. 1998 (98 pages).
CCS#7 Networks Dependability Studies: Phase 2, Network Integrity Aspects and Qualification Techniques—Restart Procedure and Link Oscillation, vol. 3 of 3: Annex B—Test Suite Production, dated Aug. 1998 (140 pages).

CCS#7 Networks Dependability Studies: Phase 2, Network Integrity Aspects and Qualification Techniques, dated Aug. 1998 (33 pages).

CCS#7 Networks Dependability Studies: Phase 2, Network Integrity Aspects and Qualification Techniques—Congestion Control and Failure Propagation, vol. 2 of 3: Annex A, Jul. 1998 (76 pages).

CCS#7 Networks Dependability Studies: Phase 2, Network Integrity Aspects and Qualification Techniques—Congestion Control and Failure Propagation, vol. 3 of 3: Annex B, Jul. 1998 (138 pages).

CCS#7 Networks Dependability Studies: Phase 2, Network Integrity Aspects and Qualification Techniques—Access Control, vol. 1 of 3: Main Core, dated Jun. 1998, (37 pages).

CCS#7 Networks Dependability Studies: Phase 2, Network Integrity Aspects and Qualification Techniques—Access Control, vol. 2 of 3: Annex A—Protocol Analysis in Access Control, dated Jun. 1998 (44 pages).

CCS#7 Networks Dependability Studies: Phase 2, Network Integrity Aspects and Qualification Techniques—Access Control, vol. 3 of 3: Annex B—Test Suite for Access Control, dated Jun. 1998 (50 pages).

"Appendix C: STP Requirements for Gateway Function," GR-82-Core, Issue 1, pp. C1-C4 (Jun. 1994).

* cited by examiner

METHOD FOR PREVENTING THE DELIVERY OF SHORT MESSAGE SERVICE MESSAGE SPAM

CROSS-REFERENCE TO RELATED APPLICATION

This application is a Section 371 National Stage application of International Application No. PCT/NL2004/000253, filed Apr. 14, 2004 and published as WO 2005/101872 A1 on Oct. 27, 2005, in English.

BACKGROUND

The invention relates to a method for transmitting or delivery of a short message service (SMS) message to a mobile terminal. More specifically the invention relates to a method and system for identifying and/or preventing unauthorised delivery of an SMS mobile terminated message.

The sending and receiving of SMS-messages has become a popular way of communication. The SMS delivery service provides a mechanism for transmitting short messages to and from SMS-capable terminals, such as wireless handsets and personal computers via the signalling component of wireless communication networks. Signalling is based on signalling system no. 7 (SS.7) which is defined as a telecommunications industry standard signalling protocol. The SMS-service makes use of the SS.7 mobile application part (MAP), which defines the methods and mechanisms of signalling communication in mobile or wireless networks. The MAP protocol utilizes the transaction capabilities application part (TCAP) component of the SS.7 protocol. Both North American and European standards bodies have defined a MAP layer using the services of the SS.7 TCAP component. The North American standard is published by Telecommunication Industry Association and is referred to as IS-41 MAP, while the European standard is defined by the European Telecommunication Standards Institute (ETSI) and is referred to as GSM MAP. Below, the term SMS-network is used to identify all communication networks, including e.g. GPRS or UMTS networks, that allow delivery of SMS-messages to SMS-capable terminals.

The SMS-infrastructure employs a short message service centre (SMSC) that functions as a store and forward platform for SMS-messages. Hereinafter the term SMSC will be used for any platform in an SMS-network with identical, similar or equivalent functions as that of an SMSC. If an SMS-message is received at the SMSC it is stored and subsequently a delivery attempt to a mobile terminal is made. If delivery of the SMS-message is not possible, the SMS-message is stored at the SMSC until the destination for the SMS-message becomes available.

The delivery of SMS-messages in an SMS-network comprises two phases. In the first phase information of the mobile terminal is requested from a Home Location Register (HLR), hereinafter also referred to as HLR-request. This information may comprise the location of the mobile terminal, such as the mobile switching station (MSC) or serving GPRS support node (SGSN) in case of a GPRS network and alternative identifications of the mobile terminal, such as the local mobile station identifier (LMSI) and/or the international mobile station identifier (IMSI). In the second phase the SMS-message itself is delivered to the mobile terminal. The time span between these two phases typically is in a range between a few seconds and several minutes.

Currently, the first and second phase in the delivery of SMS-messages over an SMS-network to a mobile terminal cannot be separately controlled at the receiving end, i.e. at the terminating HLR and/or MSC. Information on the HLR-request does e.g. not provide one with the opportunity to control the delivery of the SMS-message itself.

SUMMARY

A first aspect herein described is by a method for delivery of an SMS-message in an SMS-network comprising a network element to at least one mobile terminal comprising the steps of:
receiving first routing data for delivery of said SMS-message to said mobile terminal at said network element;
transmitting second routing data from said network element in response to receiving said first routing data;
receiving at said network element said SMS-message comprising said second routing data, and
converting at said network element said second routing data to said first routing data for delivery of said SMS-message to said mobile terminal.

Instead of providing access to the first routing data for delivery of the SMS-message to the mobile terminal in the HLR-request, the network element only transmits the second routing data in response to receiving the first routing data. The first routing data, i.e. the data to communicate with the mobile terminal, is only available to the network element, such that the second routing data functions as a key for communicating with the mobile terminal. Accordingly the HLR-request and the receipt of the SMS-message itself can be correlated resulting in the possibility to control the delivery of the SMS-message to the mobile terminal. It should be appreciated that the conversion of the second routing data to the first routing data should be broadly interpreted, i.e. it is only necessary that the first routing data can be found if the second routing data is received or known. Further it should be appreciated that the term "network element" should be broadly interpreted and may include several components or applications over which one or more of the steps for executing the method are distributed.

The first routing data may comprise the address of the terminating MSC, the LMSI and/or the IMSI. It should be appreciated that data similar to LMSI and IMSI are used under the American Standard IS-41 and that the term IMSI and/or LMSI includes these similar data. It should further be appreciated that other routing data or first and second data suitable for performing the invention to qualify as first routing data and second routing data fall under the scope of the invention.

In an embodiment of the invention, said first routing data comprises the international mobile station identifier of the mobile terminal and said second routing data comprises a different IMSI. The address of the terminating MSC is less preferred since it should preferably be included in a postfix of the 15-digit E164-specification. As most numbering plans use 11 or 12 digits, too few digits are left for appropriate implementation. However, a certain number range may be allocated for application of the MSC-address by the operator(s) in which case the use of the address of the terminating MSC as the first routing data is an option.

In an embodiment of the invention, the SMS-network further has access to a short message service centre (SMSC) and the method further comprises the steps of:
receiving at said network element a query from said SMSC for said first routing data;
transmitting a response message to said SMSC comprising said second routing data.

Prior art SMS-networks do employ SMSC's that generate the HLR-requests. However, in order to correlate or link the HLR-request and the actual SMS-message, the SMSC is provided with the second routing data instead of the first routing data.

In a particularly advantageous application, the improved control of the information flows in an SMS-network is used to identify and/or prevent unauthorised delivery of SMS mobile terminated messages. The in principle guaranteed delivery for SMS-messages of course is an attractive feature of SMS-technology. However, unwanted SMS-messages, often referred to as "spam", will be delivered as well. The increased popularity of SMS-services has recently been observed to have triggered an increasing amount of unwanted SMS-messages. Accordingly, network traffic and resource requirements have increased considerably by the large amount of unwanted SMS-messages that have to be transmitted over the SMS-network. Thus, there exists a need for identifying and/or preventing unauthorised delivery of SMS mobile terminated messages.

In an embodiment of the invention the method further comprises the step of comparing the address of the SMSC in said request and the address of the SMSC in said SMS-message for detecting unauthorized delivery of said SMS-message. In today's modern SMS networks, protection against hostile spam attacks is getting increasingly difficult as spam techniques become more advanced. For example, by changing the SMSC address ("address spoofing") in the SMS message, spammers make it very difficult to distinguish a spam message from a legitimate message from another SMS-network. Accordingly a charging problem exists, since operators send each other bills for terminating short messages in their networks. Spoofing results in operators receiving bills for SMS-messages that they have not sent themselves. The management at the network element of the first and second routing data enables a correlation at the network element of the HLR-request for the first routing data for delivery of the SMS-message and the receipt of the SMS-message, such that it can be checked whether the address of the SMSC in the HLR-request and the SMS-message is identical. If not, address spoofing is identified and appropriate action, such as discarding of the SMS-message and/or transmitting a predefined response, e.g. an error message, can be taken. It should be noted that an SMSC may have multiple addresses, e.g. one for issuing a HLR-request and one of delivery of the SMS-message.

The correlation of the HLR-request for the first routing data and the SMS-message allows further types of analysis, e.g. to identify and/or prevent unauthorized delivery of SMS-messages. In an embodiment of the invention the time interval between transmitting the second routing data and receiving said SMS-message can be determined. It is known that spammers typically first gather large amounts of routing data for delivery of SMS-messages before sending the unwanted SMS-messages, while for authorized delivery of SMS-messages usually only a limited amount of time expires. This criterion may therefore be applied to distinguish authorized from unauthorized delivery of SMS-messages.

In an embodiment of the invention the validity of said second routing data expires after a predetermined time interval. This prevents that SMS-messages are transmitted to a mobile terminal, wherein the delay between the HLR-request and forwarding of the actual SMS-message is long, being indicative of spam. The embodiment also prevents that spammers re-use the data from the HLR-request several months after retrieval. Re-use is attractive, since chances that such data are valid are high because it is very likely that the mobile terminal is served by the same MSC.

In an embodiment of the invention said transmitted second routing data are different from said received first routing data. Accordingly, the network element cannot be bypassed.

Another aspect of the invention further relates to a method for screening the first routing data, such as the IMSI. Accordingly, mobile terminals cannot be accessed directly.

Yet another aspect of the invention moreover relates to a computer program product, an SMS-network and a network element for performing or applying the methods herein described.

WO 02/071774 discloses a method for preventing delivery of unwanted SMS-messages, wherein an SMS message discrimination database is employed to determine whether an SMS-message is an unwanted message. A lookup in the database can be performed on the basis of sending and receiving party information, such as a mobile subscriber integrated services digital network (MSISDN) number or an international mobile station identifier (IMSI) number. As such, the network operator or the individual subscriber control which SMS-type messages are delivered to an SMS service subscriber. The publication does not disclose the transmittal of second routing data in response to receiving first routing data for delivery of SMS-messages. Further the methods and systems rely on obtaining sending and receiving party information, implementing this information in a database and defining actions when such information is detected. This is a laborious activity and does not assist to identify or prevent unauthorized delivery of SMS-messages in cases of address spoofing as previously mentioned. Moreover, this method can only be applied after a first spamming session is performed, since only then the sending party information may be known. Also, address spoofing cannot be prevented.

BRIEF DESCRIPTION OF THE DRAWINGS

Aspects of the invention will be further illustrated with reference to the attached drawings, which schematically show an embodiment according to the invention. It will be understood that the invention is not in any way restricted to this specific embodiment.

In the drawings.

DETAILED DESCRIPTION

Figure 1:
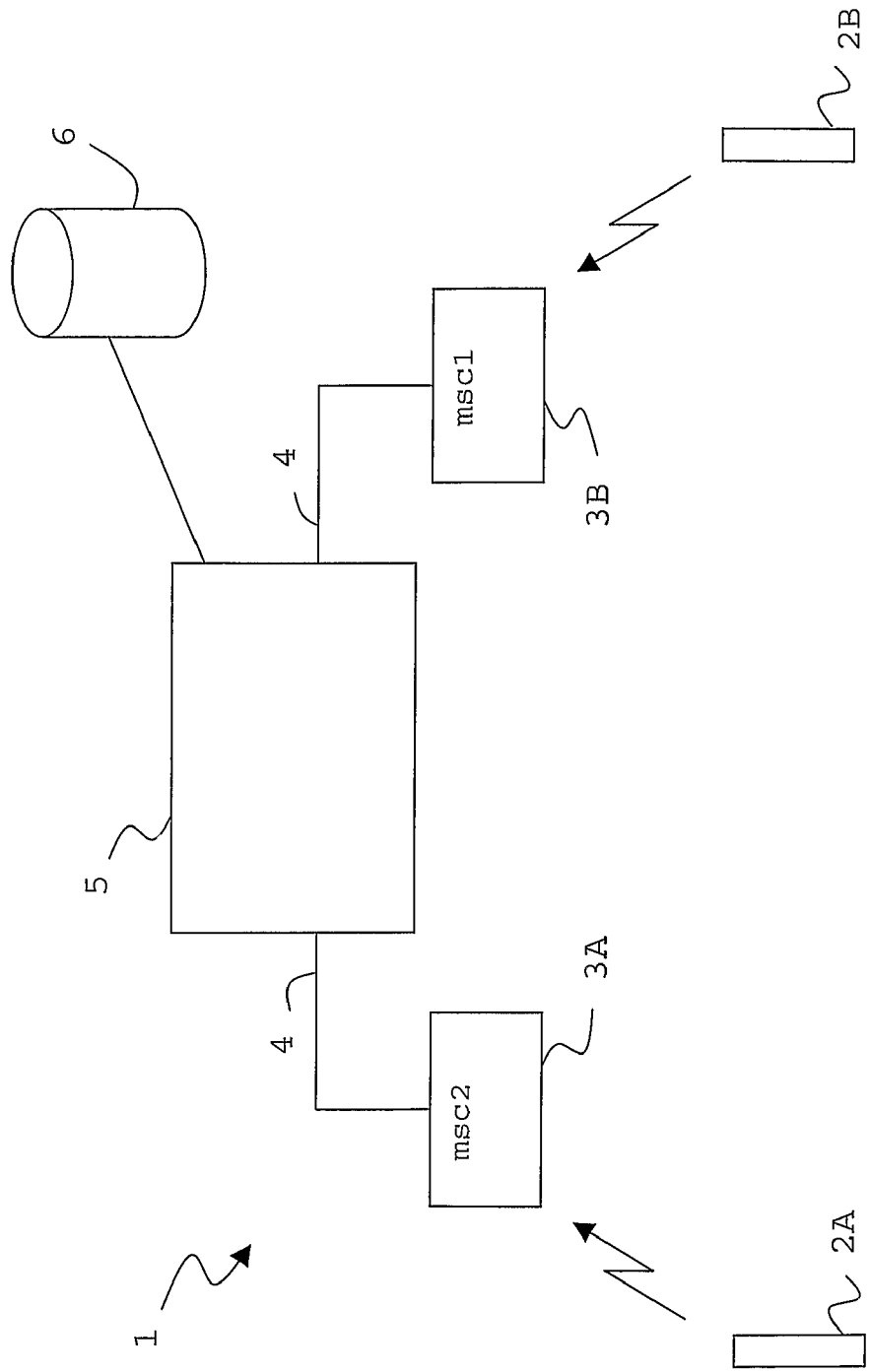
FIG. 1 shows an example of a part of a prior art SMS-network.

FIG. 1 shows an SMS-network 1 comprising mobile terminals 2A, 2B that are wirelessly connected to mobile switching stations (MSC's) 3A, 3B, having MSC-addresses msc2 and msc1. The MSC's 3A, 3B are connected via lines 4 to a short message switching centre (SMSC) 5. The SMSC 5 further has access to a home location register (HLR) 6 that comprises first routing data for the mobile terminals 2A, 2B, e.g. the international mobile station identifier (IMSI) of each mobile terminal 2 within the area of the SMSC 5. It is noted that conventionally the MSC's 3A, 3B are connected to a plurality of base stations (not shown), the latter being in wireless communication with the mobile terminals 2A, 2B.

In operation, an SMS-message may be sent from mobile terminal 2A to mobile terminal 2B. The SMS-message is input to the mobile terminal 2A and sent to the mobile terminal 2B by choosing the mobile subscriber integrated services digital network (MSISDN) number of mobile terminal 2B, i.e. msisdn1 in this example. The SMS-message is received at the MSC 3A covering the area wherein mobile terminal 2A is present and is subsequently forwarded to the SMSC 5 over line 4. The SMSC 5 is a store and forward platform for SMS-messages to the mobile terminal 2B. If immediate delivery of the SMS-message to the mobile terminal 2B is not possible, the SMS-message is stored at the SMSC 5 until the destination for the SMS-message becomes available.

Figure 2:
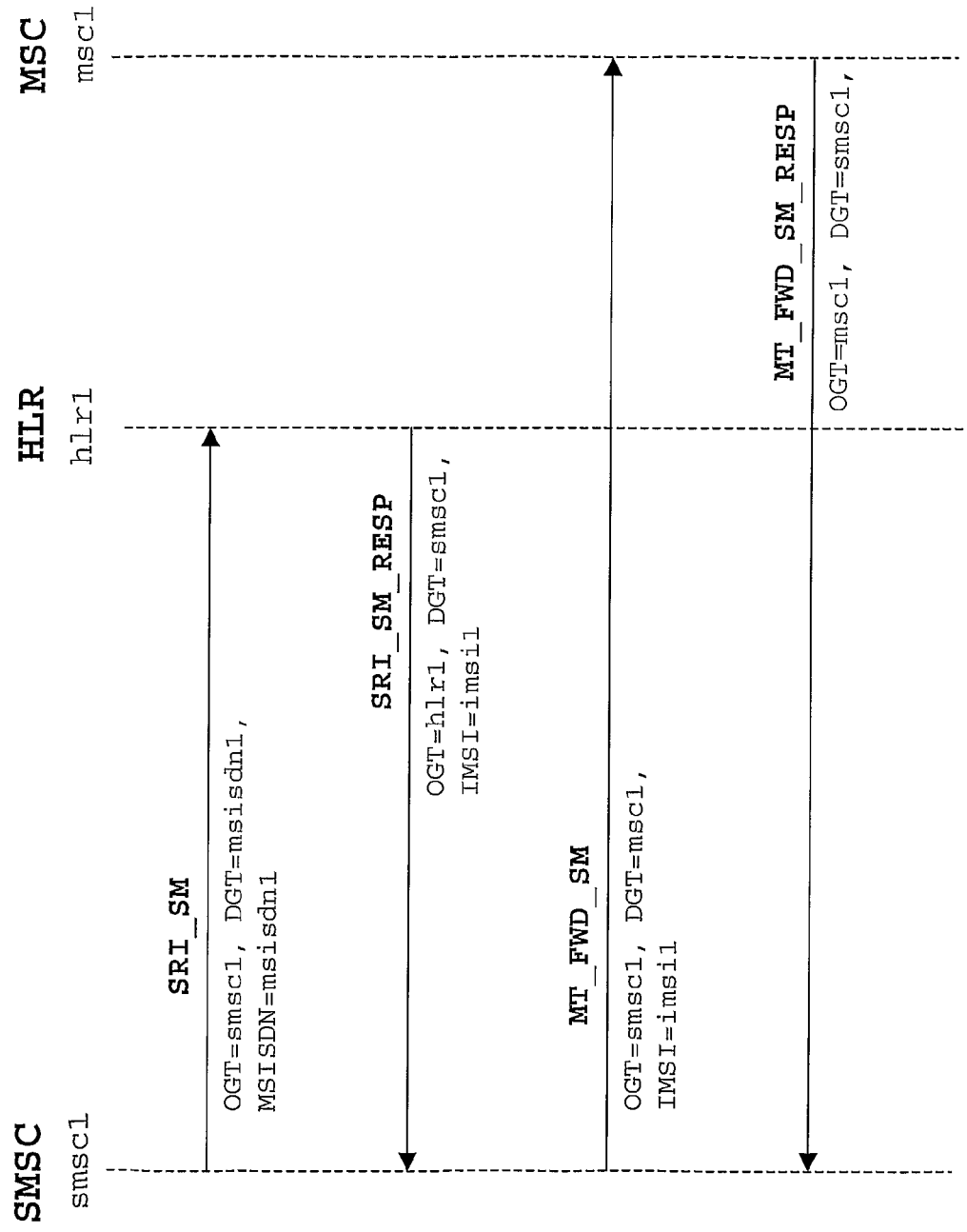
FIG. 2 shows a process diagram illustrating the information flow in a part of the SMS-network of FIG. 1.

FIG. 2 shows the operation for delivery of the SMS-message to the mobile terminal 2B in the part of the SMS-network 1 between the SMSC 5 and the MSC 3B in terms of SS.7 in the signal connection control part (SCCP) of the SS.7 protocol stack. The process diagram has a time-axis in the vertically downward direction.

The delivery of SMS-messages comprises two phases. In the first phase the location information of the mobile terminal is requested from the HLR 6 with address hlr1, indicated as SEND ROUTING INFO FOR SM (SRI_SM), hereinafter also referred to as a HLR-request. The HLR-request comprises the originating global title (OGT), i.e. the SMSC-address, and the destination global title (DGT), i.e. the requested msisdn1 in this case. The HLR-request generates a response SRI_SM_RESP that comprises the IMSI of the mobile terminal 2B, i.e. imsi1 assigned to msisdn1, to the SMSC 5. In the second phase the SMS-message itself, i.e. the actual SMS-message including content, is delivered in message MT_FWD_SM to the mobile terminal 2B, by addressing the MSC 3B with address msc1. The MSC 3B transmits a delivery confirmation MT_FWD_SM_RESP to the SMSC 5. The time span between the two phases typically is in a range between a few seconds and several minutes for authorized delivery of SMS-messages.

In a situation wherein multiple SMSC's 5 are involved, it is possible to send the SMS-message with a forged SMSC-address in the MT_FWD_SM message, to hide the real identity of the sending network and SMSC. For example, a party using an SMS-network A to send (unwanted) SMS-messages to recipients in SMS-network B may set the SMSC-address of the SMSC 5A of network A on both SCCP and MAP level in the SS.7 protocol stack to that of a different SMSC 5 of SMS-network C, thus implying that SMS-network C is the originator of the messages. This is possible since the malicious party in network A is not interested in a delivery confirmation MT_FWD_SM_RESP from network B.

Figure 3:
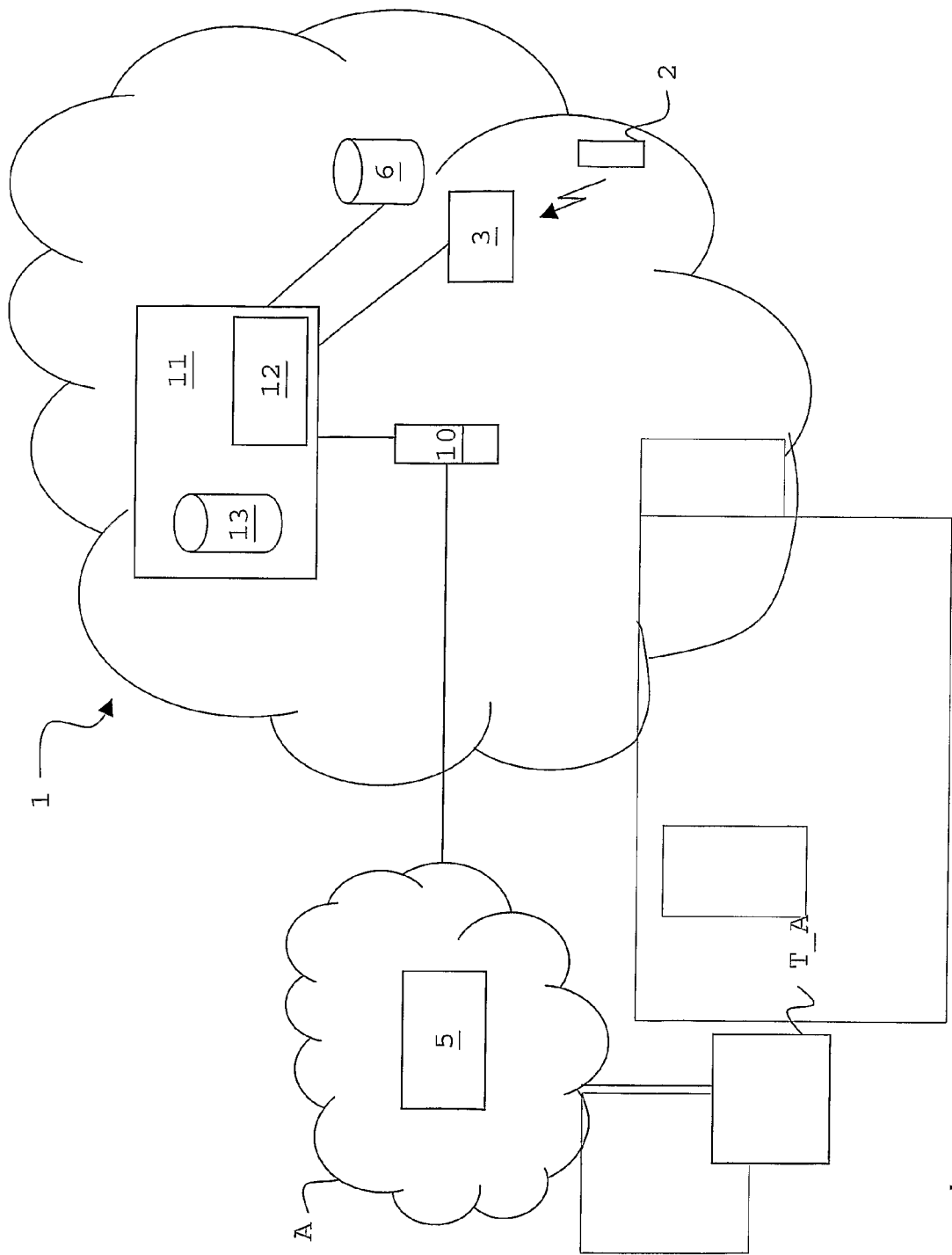
FIG. 3 shows some elements of an SMS-network according to an embodiment of the invention.

FIG. 3 shows some elements of an SMS-network 1 according to an embodiment of the invention and a terminal T_A in communicative connection with a network A to send SMS-messages to mobile terminals 2 in the SMS-network 1. The SMS-network 1 comprises a router 10, in SS.7 terminology also referred to as signal transfer point (STP). The router 10 is set such that HLR-queries for the HLR 6 in the SMS-network 1 are directed to the network element 11 by MAP screening. MAP screening allows routing on the basis of the operation, i.e. SRI_SM or MT_FWD_SM, and the OGT. The network element 11 is an SMS-routing system and will hereinafter also be referred to as SMR. The SMR 11 comprises a converter 12 and a database, memory or lookup table (LUT) 13.

Figure 4:
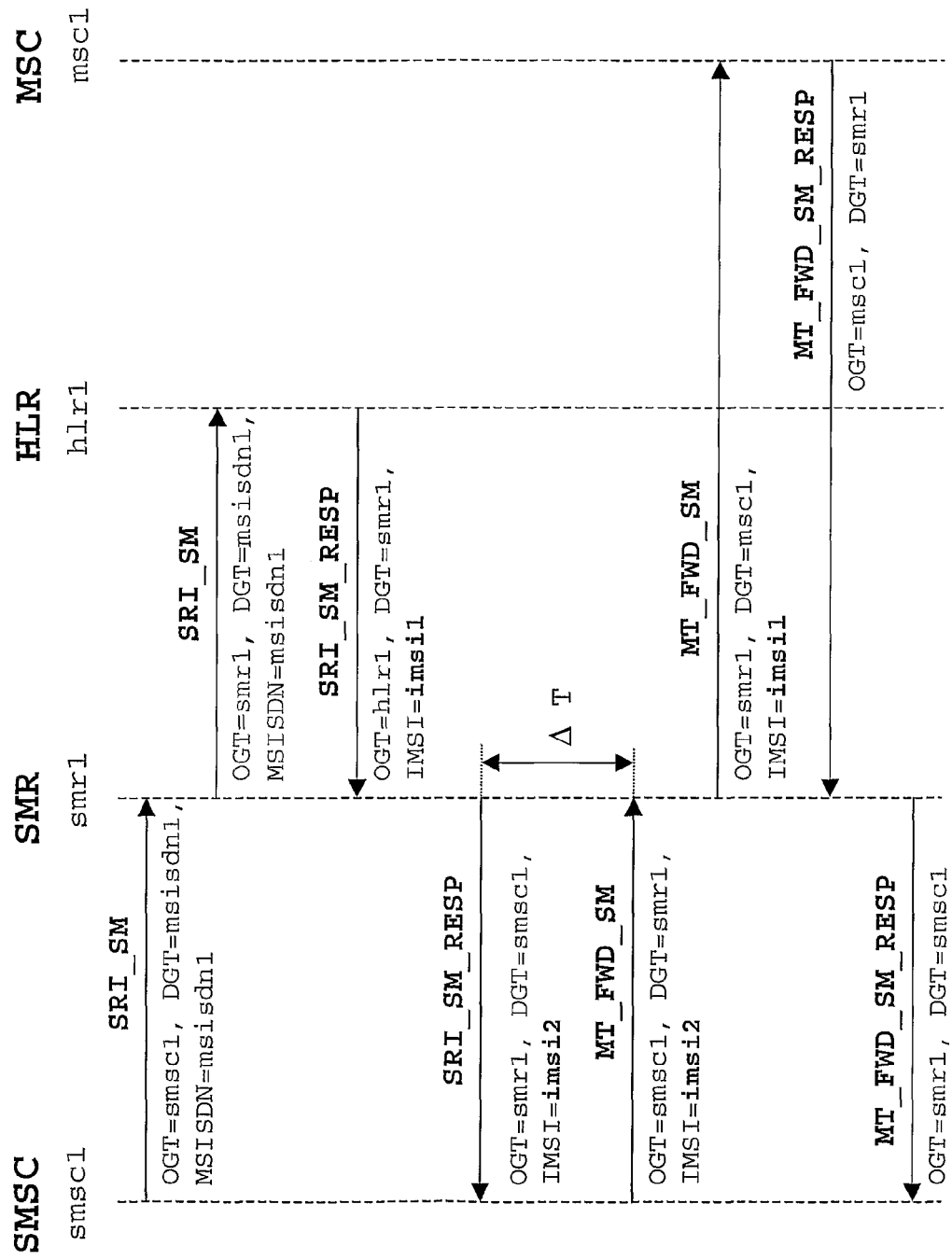
FIG. 4 shows a first process diagram illustrating the information flow in a part of the SMS-network of FIG. 3 according to an embodiment of the invention.

The SMS-network 1 and SMR 11 enable improved control of the information flow, as will be illustrated by reference to FIG. 4. The network element or SMR 11 may execute code portions of a computer program product to enable this improved control. Again, it is noted that the various functions performed in this method or computer program may be implemented in different elements or applications, e.g. in a distributed environment, in which case the network element 11 is to be regarded as the set of these elements and/or applications.

The first phase the delivery process again comprises the HLR-request SRI_SM to obtain the first routing data of the mobile terminal 2, e.g. imsi1 assigned to msisdn1. The router 10 is set such that this request is directed to the SMR 11. The request SRI_SM is forwarded to the HLR 6, however with the OGT set to smr1, i.e. the address of the SMR 11. Subsequently the SMR 11 receives the first routing data, i.e. imsi1 in this case, for delivery of the SMS-message to the mobile terminal 2. Thus, in contrast to the prior art process as displayed in FIG. 2, imsi1 is not transmitted to the SMSC 5 but to the SMR 11. The converter 12 converts or translates the first routing data, i.e. imsi1, to second routing data, e.g. imsi2. The message SRI_SM_RESP comprises imsi2 and is transmitted to the SMSC 5 in response to receiving imsi1 in the SRI_SM_RESP from HLR 6. The LUT 13 stores the values of imsi1 and imsi2 such that imsi1 can be derived from imsi2. As an example, imsi1 and imsi2 are related, such that:

$$imsi2 = f(imsi1)$$

$$imsi1 = f'(imsi2)$$

wherein f' is the inverse function of f. The functions may use additional parameters, such as OGT-addresses, current date/time etc.

In the second phase, the actual SMS-message is forwarded in MT_FWD_SM to the SMR 11 with the second routing data, i.e. imsi2 in this example. The converter 12 searches in the LUT 13 for the first routing data imsi1 required to deliver the SMS-message to the mobile terminal 2 on the basis of the received second routing data. When imsi1 has been found, the SMS-message may be forwarded to the MSC 3 to deliver this message to the mobile terminal 2. Finally the MSC 3 may provide a delivery confirmation MT_FWD_SM_RESP to the SMR 11 that may be forwarded to the SMSC 5.

The method and system according to this embodiment of the invention enable that instead of providing access to the first routing data for delivery of the SMS-message to the mobile terminal 2 in the HLR-request SRI_SM, the network element 11 only transmits the second routing data in response to receiving the first routing data. The first routing data, i.e. the data to communicate with the mobile terminal 2, are only available for the network element 11, i.e. the second routing data functions as a key for communicating with the mobile terminal. Accordingly the HLR-request SRI_SM and the receipt of the SMS-message MT_FWD_SM can be correlated resulting in the possibility to control the delivery of the SMS-message to the mobile terminal.

It is noted that while in the above embodiment of the invention, the first routing data comprises the international mobile station identifier (IMSI) of the mobile terminal 2 and the second routing data comprises a converted IMSI, other routing data may be used as well, such as the address of the MSC 3 or the local mobile station identifier (LMSI).

In a particularly advantageous embodiment for control of the information flow in the SMS-network 1, the network element 11 can be used for identifying and/or preventing unauthorised delivery of an SMS mobile terminated message, i.e. as a firewall. In an embodiment of the invention the method further comprises the step of comparing the address of the SMSC 5 in the HLR-request SRI_SM and the address of the SMSC 5 in the SMS-message MT_FWD_SM. As previously mentioned, advanced spamming techniques allow the address of the SMSC 5 to be different between the information flows SRI_SM and MT_FWD_SM (address spoofing) such that a malicious sender of unwanted SMS-messages from terminal T_A in FIG. 3 remains anonymous. The management at the network element 11 of the first and second routing data as described above for imsi1 and imsi2, enables a correlation of the HLR-request SRI_SM for the first routing data for delivery of the SMS-message and the receipt of the SMS-message MT_FWD_SM, such that it can be checked whether the address of the SMSC 5 in the HLR-request SRI_SM and the SMS-message MT_FWD_SM is identical. If not, address spoofing is identified and appropriate action, such as discarding of the SMS-message and/or transmitting a predefined response to the SMSC 5, e.g. an error message, can be performed. The SMS-message preferably will not be forwarded to the MSC 3 or the mobile terminal 2, such that the user of the mobile terminal 2 is not bothered. Further the capacity of the SMS-network 1 and requirements for the elements thereof are saved for delivery of authorized SMS-messages.

Alternatively or in addition, the time interval ΔT between transmitting the second routing data in SRI_SM_RESP to the SMSC 5 and receiving the SMS-message in MT_FWD_SM at the network element 11 can be determined or monitored. Typically, spammers first collect large amounts of routing data for delivery of the unwanted SMS-messages to the mobile terminals 2 before actually transmitting the SMS-messages, which takes a considerable mount of time. In contrast, authorized delivery of SMS-messages is usually performed in a range within seconds up to several minutes. Thus, the time interval ΔT can be used to distinguish authorized from unauthorized delivery of SMS-messages. If e.g. a time interval ΔT of more than 1 hour is determined, the SMS-message is identified as unauthorized and appropriate action can be taken.

Figure 5:
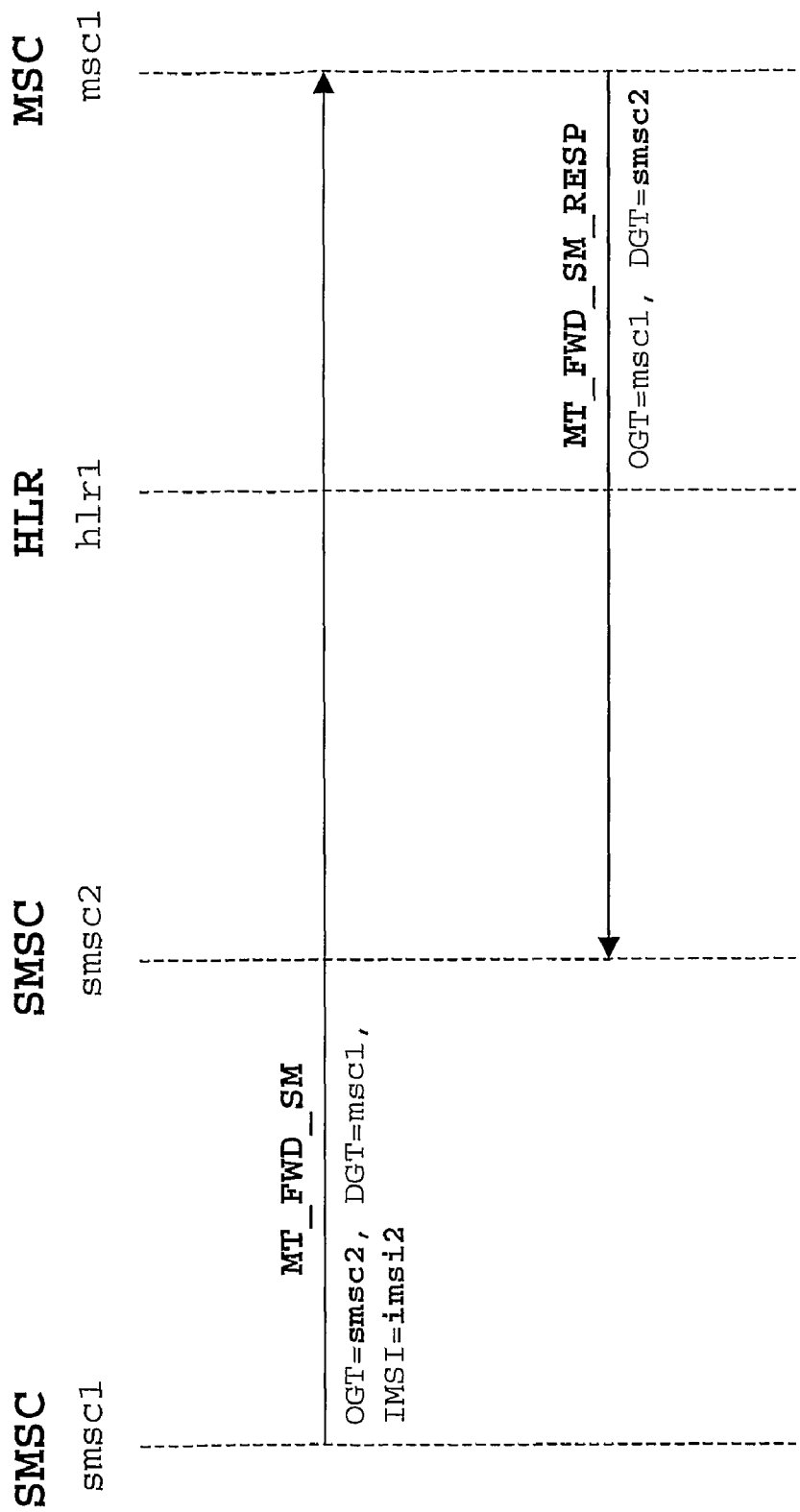
FIG. 5 shows a second process diagram illustrating the information flow in a part of the SMS-network of FIG. 3 according to an embodiment of the invention.

Preferably, the transmitted second routing data to the SMSC 5 are different from the received first routing data of the HLR 6. FIG. 5 shows a second process diagram illustrating the information flow in a part of the SMS-network of FIG. 3 according to an embodiment of the invention. It is assumed that the SMSC 5 has already acquired the second routing data imsi2 from the SMR 11. In the process shown, address spoofing is applied since the OGT in MT_FWD_SM comprises an address smsc2 which is not the real address smsc1 of the SMSC that sends the SMS-message. The SMS-message MT_FWD_SM is directly send to the terminating MSC 3. However, since the second routing data are unknown for the MSC 3, which only possesses the first routing data imsi1 of the mobile terminals 2, the delivery of the SMS-message to the mobile terminal 2 fails. Accordingly, bypassing of the SMR 11 in the second phase, wherein the actual SMS-message MT_FWD_SM is sent, does not succeed. Since both the HLR-request SRI_SM and the SMS-message MT_FWD_SM do pass the SMR 11 or are available to the SMR 11, the information flows can be controlled.

Finally it is noted that the method and network element according to an aspect of the invention can be applied together with other methods for controlling information flows, such as identifying and/or preventing unauthorised delivery of SMS mobile terminated messages.

The invention claimed is:

1. A method for delivery of a short message service (SMS) message in an SMS-network comprising a network element to at least one mobile terminal, said method comprising:
receiving first routing data (imsi1) for delivery of said SMS-message to said mobile terminal at said network element;
transmitting second routing data (imsi2) from said network element in response to receiving said first routing data (imsi1);
receiving at said network element said SMS-message comprising said second routing data (imsi2);
converting at said network element said second routing data (imsi2) to said first routing data (imsi1) for delivery of said SMS-message to said mobile terminal; and
at the network element:
using said first and second routing data to correlate a request for said first routing data with receipt of said SMS message; and
comparing an SMSC address in said request for said first routing data with an SMSC address in said SMS message to detect the presence of address spoofing.

2. The method of claim 1, wherein said first routing data comprises the international mobile station identifier (IMSI) (imsi1) of the mobile terminal and said second routing data comprises a different (imsi2).

3. The method of claim 1, wherein said SMS-network further has access to a short message service centre (SMSC) and said method further comprises:
receiving at said network element said request (SRI_SM) from said SMSC for said first routing data (imsi1);
transmitting a response message (SRI_SM_RESP) to said SMSC comprising said second routing data (imsi2).

4. The method of claim 3, further comprising the step of comparing the address of said SMSC in said request (SRI_SM) and the address of said SMSC in said SMS-message for detecting unauthorized delivery of said SMS-message.

5. The method according to claim 1, further comprising determining the time interval (ΔT) between transmitting said second routing data (imsi2) and receiving said SMS-message.

6. The method according to claim 1, wherein the validity of said second routing data (imis2) expires after a predetermined time interval.

7. The method according to claim 1, wherein said transmitted second routing data (imsi2) are different from said received first routing data (imsi1).

8. A method for delivery of a short message service (SMS) message in an SMS-network comprising a network element to at least one mobile terminal, said method comprising:
receiving first routing data (imsi1) for delivery of said SMS-message to said mobile terminal at said network element;
transmitting second routing data (imsi2) from said network element in response to receiving said first routing data (imsi1); and
at the network element:
using said first and second routing data to correlate a request for said first routing data with receipt of an SMS message including said second routing data; and
comparing an SMSC address in said request for said first routing data with an SMSC address in said SMS message to detect the presence of address spoofing.

9. A non-transitory computer program product for delivery of a short message service (SMS) message in an SMS-network comprising a network element to at least one mobile terminal at least including computer executable code portions for:
receiving first routing data (imsi1) for delivery of said SMS-message to said mobile terminal at said network element;

transmitting second routing data (imsi2) from said network element in response to receiving said first routing data (imsi1);

receiving at said network element said SMS-message comprising said second routing data (imsi2);

converting at said network element said second routing data (imsi2) to said first routing data (imsi1) for delivery of said SMS-message to said mobile terminal; and at the network element:
  using said first and second routing data to correlate a request for said first routing data with receipt of said SMS message; and
  comparing an SMSC address in said request for said first routing data with an SMSC address in said SMS message to detect the presence of address spoofing.

10. The non-transitory computer program product according to claim 9, further comprising computer executable code portions configured such that said first routing data comprises the international mobile station identifier (IMSI) (imsi1) of the mobile terminal and wherein said second routing data comprises a different IMSI (imsi2).

11. An SMS-network comprising a network element for delivery of a short message service (SMS) message to at least one mobile terminal, said network element being adapted for:

receiving first routing data (imsi1) for delivery of said SMS-message to said mobile terminal;

transmitting second routing data (imsi2) in response to receiving said first routing data (imsi1);

receiving said SMS-message comprising said second routing data (imsi2);

converting said second routing data (imsi2) to said first routing data (imsi1) for delivery of said SMS- message to said mobile terminal; and at the network element:
  using said first and second routing data to correlate a request for said first routing data with receipt of said SMS message; and
  comparing an SMSC address in said request for said first routing data with an SMSC address in said SMS message to detect the presence of address spoofing.

12. The SMS-network according to claim 11, wherein said network element is further adapted such that said first routing data comprises the international mobile station identifier (IMSI) (imsi1) of the mobile terminal and said second routing data comprises a different IMSI (imsi2).

13. A network element for use in an SMS-network for delivery of a short message service (SMS) message to at least one mobile terminal, said network element being adapted for:

receiving first routing data (imsi1) for delivery of said SMS-message to said mobile terminal (2);

transmitting second routing data (imsi2) in response to receiving said first routing data (imsi1);

receiving said SMS-message comprising said second routing data (imsi2), converting said second routing data (imsi2) to said first routing data (imsi1) for delivery of said SMS-message to said mobile terminal (2);

at the network element:
  using said first and second routing data to correlate a request for said first routing data with receipt of said SMS message; and
  comparing an SMSC address in said request for said first routing data with an SMSC address in said SMS message to detect the presence of address spoofing.

14. The network element according to claim 13, wherein said network element is further adapted such that said first routing data comprises the international mobile station identifier (IMSI) (imsi1) of the mobile terminal and said second routing data comprises a different IMSI (imsi2).

15. The method of claim 2, wherein said SMS-network further has access to a short message service centre (SMSC) and said method further comprises the steps of:

receiving at said network element a request (SRI SM) from said SMSC for said first routing data (imsi1); and transmitting a response message (SRI_SM_RESP) to said SMSC comprising said second routing data (imsi2).

\* \* \* \* \*